United States Patent
Ayandeh

(10) Patent No.: US 10,341,255 B2
(45) Date of Patent: Jul. 2, 2019

(54) SWITCH RESOURCE MANAGER

(71) Applicant: HEWLETT PACKARD ENTERPRISE DEVELOPMENT LP, Houston, TX (US)

(72) Inventor: Siamack Ayandeh, Littleton, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 253 days.

(21) Appl. No.: 15/337,239

(22) Filed: Oct. 28, 2016

(65) Prior Publication Data
US 2018/0123975 A1     May 3, 2018

(51) Int. Cl.
| | |
|---|---|
| *H04L 12/927* | (2013.01) |
| *H04L 12/18* | (2006.01) |
| *H04L 12/771* | (2013.01) |

(52) U.S. Cl.
CPC ........ *H04L 47/808* (2013.01); *H04L 12/1886* (2013.01); *H04L 45/56* (2013.01)

(58) Field of Classification Search
CPC ......... G06F 2009/4557; G06F 11/1484; H04L 12/927; H04L 12/18
See application file for complete search history.

(56) References Cited

U.S. PATENT DOCUMENTS

| | | | |
|---|---|---|---|
| 7,818,452 B2 | 10/2010 | Matthews et al. | |
| 8,165,466 B2 | 4/2012 | Emery et al. | |
| 8,601,110 B2 | 12/2013 | Matthews et al. | |
| 8,817,621 B2 | 8/2014 | Casado et al. | |
| 9,054,947 B2 | 6/2015 | Cors et al. | |
| 9,396,152 B2* | 7/2016 | Pethe | G06F 13/4027 |
| 2013/0263116 A1* | 10/2013 | Haupt | G06F 9/5016 718/1 |
| 2014/0068636 A1* | 3/2014 | Dupont | G06F 9/46 719/318 |
| 2016/0378564 A1* | 12/2016 | Gaurav | G06F 9/5077 718/1 |
| 2017/0052801 A1* | 2/2017 | Nguyen | G06F 1/20 |
| 2017/0149936 A1* | 5/2017 | Moon | H04L 12/4641 |
| 2017/0237691 A1* | 8/2017 | Suresh | H04L 49/70 370/392 |

OTHER PUBLICATIONS

Gregory Pickett, "Staying Persistent in Software Defined Networks," DefCon 23, Las Vegas, 2015, pp. 1-65, Hellfire Security, Chicago, Illinois, USA.

* cited by examiner

*Primary Examiner* — Henry Tsai
*Assistant Examiner* — Christopher Daley
(74) *Attorney, Agent, or Firm* — Hewlett Packard Enterprise Patent Department

(57) ABSTRACT

Example implementations relate to a switch resource manager for a network switching device. In an example, a network switching device includes a packet switching device and an operating system kernel. The operating system kernel includes a driver for the packet switching device. The network switching device also includes a switch resource manager including a library of commands for the packet switching device. The switch resource manager can send commands to the packet switching device via the driver. The operating system kernel can load a network operating system instance into user space of the network switching device.

20 Claims, 3 Drawing Sheets

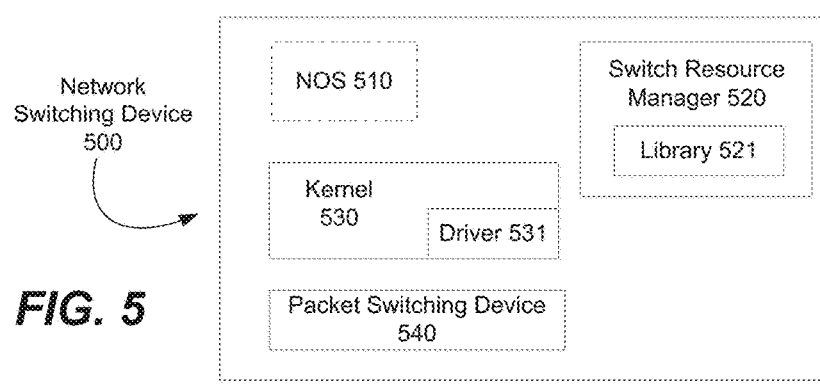
FIG. 5
FIG. 6
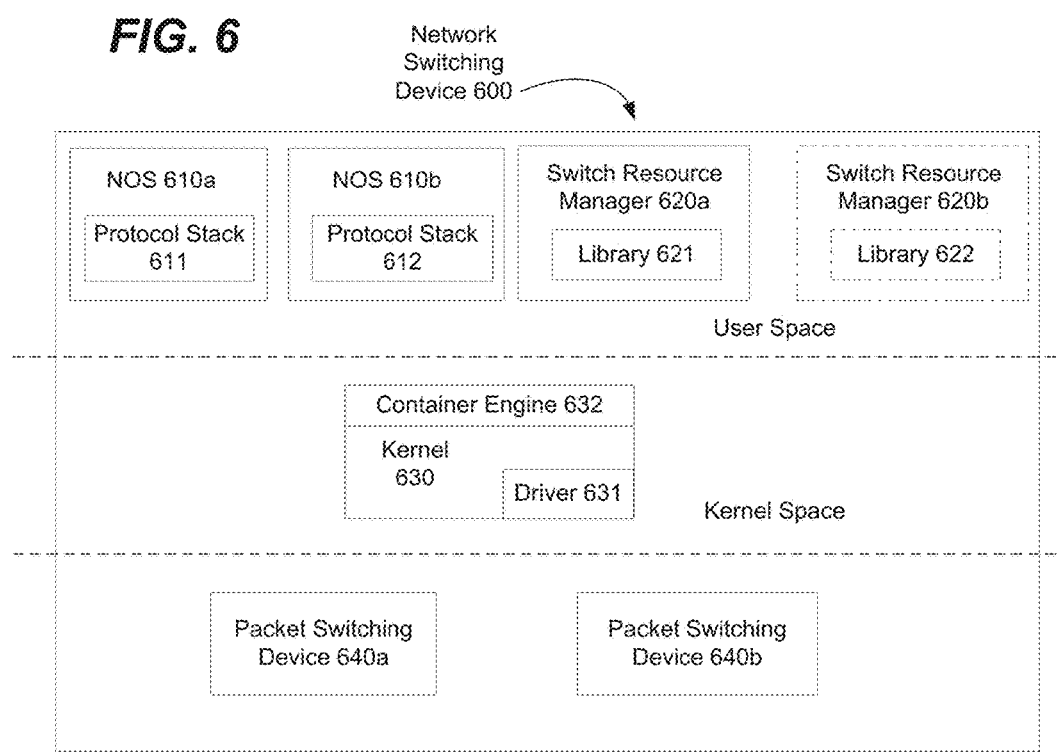

SWITCH RESOURCE MANAGER

BACKGROUND

A network switching device, such as an Ethernet switch, includes a data plane and a control plane. The data plane is for switching packets while the control plane is for controlling operation of the device as a whole and for configuring the data plane. The data plane can include one or more packet switching devices (e.g., Application Specific Integrated Circuits designed for switching packets), ports, physical layer chips, and the like. The control plane can include a processing resource (e.g., CPU) and memory (e.g., RAM, Flash). The processing resource is connected to the data plane via a physical connection, such as a Peripheral Component Interconnect Express (PCIe) bus.

The control plane of the network switching device includes a network operating system (NOS) stored in memory and executed by the CPU. The NOS includes an operating system kernel (e.g., Linux kernel) and a protocol stack (e.g., a set of software modules to implement various networking protocols). The NOS can be accessed by a user via a command line interface. The NOS configures the data plane of the network switching device to process and forward packets received via the ports. To enable this, the NOS includes a software development kit (including a library of commands) and driver for the one or more packet switching devices in the data plane.

BRIEF DESCRIPTION OF THE DRAWINGS

FIG. 5 illustrates a network switching device including a switch resource manager, according to an example.

FIG. 6 illustrates a network switching device including a switch resource manager, according to an example.

DETAILED DESCRIPTION

Figure 1:
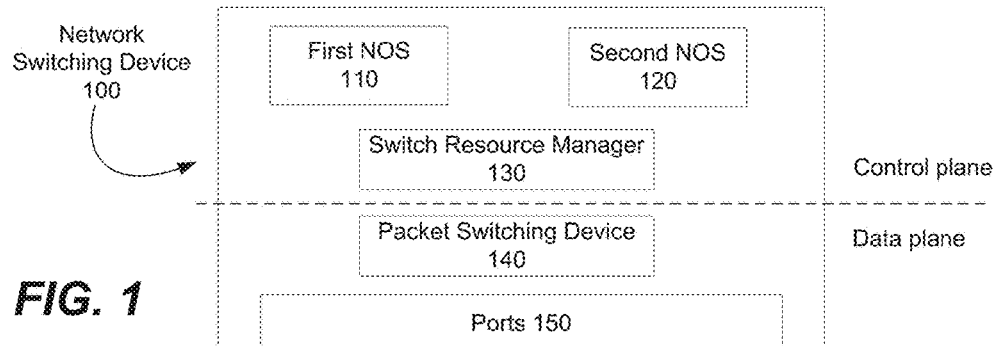
FIG. 1 illustrates a network switching device including a switch resource manager, according to an example.

As described above, a network operating system (NOS) for a network switching device (e.g., Ethernet switch) is a single, monolithic software image that includes multiple components: an operating system kernel, a protocol stack, a software development kit for a packet switching device(s) of the network switching device, and a driver for the packet switching device(s). As a result, these various components are closely tied together, making it challenging to upgrade any single one or replace one with another. There is also a lack of redundancy since a fatal error in the NOS will result in the entire network switching device crashing, which can interrupt network traffic flow. Additionally, only a single NOS can be executed by a network switching device at one time (while virtualization of a second NOS is conceivable, the second NOS would actually be executed by the underlying first NOS originally installed on the network switching device). Furthermore, only a single type of packet switching device may be supported by the NOS, since a different packet switching device would require a different software development kit and driver.

According to examples described herein, a new paradigm for a NOS architecture is disclosed. The protocol stack is separated from the operating system kernel. The protocol stack becomes what is now referred to herein as the NOS, while the operating system kernel becomes the base operating system of the network switching device. To enable this separation, a new construct referred to as a switch resource manager is introduced.

The switch resource manager is responsible for mediating between the NOS (i.e., the protocol stack) and the switch device (software development kit) SDK with respect to the one or more packet switching devices. To do this, the switch resource manager includes the SDK for the packet switching device(s). For example, the switch resource manager can be considered a software wrapper around the SDK. Thus, commands for the packet switching device are sent by the NOS to the switch resource manager as calls to the SDK. The switch resource manager determines whether to pass the command on to the SDK and operating system kernel, which includes the driver for the packet switching device(s). To assist in this determination, the switch resource manager can include a resource map that tracks which resources of the packet switching device and network switching device as a whole have been allocated to the NOS. An example of these resources would be ports of the network switching device and the corresponding traffic lanes to the packet switching device(s) that correspond with the ports. As a result, multiple and different NOSs (e.g., having different protocol stacks and/or different implementations of protocols) may be executed in the control plane, since the switch resource manager can partition resources of the network switching device, allocate the partitions to the different NOSs, and enforce the allocation.

In an example, a network switching device includes ports and a packet switching device associated with the ports. The device also includes a first NOS instance, a second NOS instance, and a switch resource manager. The switch resource manager is to (1) allocate a first plurality of the ports to the first NOS instance and a second plurality of the ports to the second NOS instance, and (2) enforce the allocation such that the first NOS instance can control the packet switching device for only the first plurality of the ports and the second NOS instance can control the packet switching device for only the second plurality of the ports. The allocation can be enforced based on the switch resource manager mediating between the NOS instances and an SDK of the packet switching device. The switch resource manager can check that all SDK calls from the NOS instances are consistent with the allocation of ports. For example, if the first NOS instance sends an SDK call that attempts to configure the packet switching device for traffic received from ports that were not allocated to the first NOS instance, the switch resource manager can reject the SDK call, thus enforcing the allocation.

In another example a network switching device includes a packet switching device and an operating system kernel that includes a driver for the packet switching device. The device also includes a switch resource manager including a library of commands for the packet switching device. The switch resource manager can send commands to the packet switching device via the driver. The operating system kernel can load a network operating system instance into user space of the network switching device.

In another example, a switch resource manager for a network switching device includes an SDK to interface with a driver for a packet switching device of the network switching device. The switch resource manager also includes a resource map to identify an allocation of resources of the packet switching device to multiple network operating system instances installed in user space of the network switching device. The switch resource manager further includes a configuration interface to receive instructions to populate the resource map. The switch resource manager is separate from the network operating system instances and from an operating system kernel of the network switching device.

Details of these examples are described more fully in the description below. These examples and others are described with reference to the figures. Unless noted otherwise, the figures and their accompanying description are non-limiting, and no element is characteristic of any particular example. In that regard, features from one example may be freely incorporated into other examples without departing from the spirit and scope of the disclosure.

FIG. 1 illustrates a network switching device 100 including a switch resource manager 130, according to an example. Network switching device 100 may be an Ethernet switch, Internet Protocol (IP) router, layer 2/layer 3 switch, or the like. Device 100 may include components associated with its data plane and components associated with its control plane. The terms data plane and control plane, and the dashed line delineating the two in FIG. 1, are used herein merely to aid easier comprehension of the examples and are not meant to be limiting.

As noted previously, the data plane of a network device is responsible for processing and forwarding traffic. Within the data plane, device 100 may include ports 150 for connecting to other network switching devices, to other intermediary devices in the network (e.g., Network Controller, Intrusion Detection System, Intrusion Prevention System, Load Balancer, etc.), or to end points (e.g., user computers, servers, etc.). Device 100 may receive traffic from connected devices in the form of packets via the ports 150.

Device 100 may also include one or more packet switching devices 140 in the data plane. The packet switching device(s) 140 may be implemented using application programming integrated circuits (ASICs) designed for processing and switching packets very quickly. The packet switching device 140 may include various resources for achieving this, such as counters, tables, and access control lists (e.g., implemented with tertiary content addressable memory (TCAM)).

The packet switching devices 140 may constitute a switching fabric within network switching device 100. For example, multiple packet switching devices 140 may be deployed, each having responsibility for traffic ingressing via assigned groups of ports 150. For instance, a first packet switching device may be assigned ports 1-64 and a second packet switching device may be assigned ports 65-128. The multiple packet switching devices 140 responsible for different port groups may themselves be connected to each other via one or more switch fabric devices. The role of a switch fabric device is to pass traffic processed by one packet switching device 140 to another packet switching device 140 so that the traffic can be forwarded out one of the latter packet switching device's ports. Another method of interconnecting two packet switching devices 140 is via an external cable connection, in which one or more ports (of ports 150) associated with a first packet switching device 140 is connected to one or more ports (of ports 150) associated with a second packet switching device 140. The data plane of device 100 may include other components for proper functioning, such as physical layer chips as well as connections between the ports 150, physical layer chips, and packet switching device(s) 140.

As noted previously, the control plane of a network device is responsible for controlling the network device as a whole, as well as for configuring the data plane. The components in the control plane of device 100 may be implemented by instructions stored in memory and executed by a processing resource (e.g., CPU) of device 100. Furthermore, in addition to the NOSs 110, 120 and switch resource manager 130 described below, the control plane may also include other components necessary for the proper functioning of device 100, such as a physical connection (e.g., Peripheral Component Interconnect Express (PCIe) bus) to the data plane.

Within its control plane, device 100 may include a first network operating system (NOS) 110 and a second NOS 120. The NOSs 110, 120 may each include a protocol stack for implementing various networking protocols. For example, each NOS may include software modules for implementing layer 2 protocols (e.g., Address Resolution Protocol, Spanning Tree Protocol), layer 3 protocols (e.g., Exterior Gateway Protocol, Internet Group Management Protocol, Internet Protocol version 4 and 6, Routing Information Protocol), as well as protocols from other layers in the Internet protocol suite or from other networking protocol suites. The NOSs 110, 120 may be designed by different networking software vendors and may support different operations and protocols. Additionally, each NOS when installed on a network switching device may be referred to as an "NOS instance", meaning an instantiation of the NOS on the particular network switching device (e.g., network switching device 100, to distinguish it from other instances of the same NOS deployed on other network switching devices).

The NOSs may configure the packet switching device 140 to process and forward network traffic. For example, the NOSs may program particular behavior into the packet switching device 140 so that packets are processed in a certain manner (e.g., performing checks, adding or changing header fields, etc.) according to the protocol stack of the NOS. Additionally, the NOSs may instruct the packet switching device 140 regarding the appropriate next-hop address for a packet, so that the packet switching device forwards the packet out the correct port (of ports 150).

Device 100 may further include a switch resource manager 130. The switch resource manager is responsible for partitioning the ports 150 and other resources of network switching device 100 and packet switching device 140 so that the first NOS 110 and second NOS 120 can co-exist on networking switching device 100 without impacting the other. For example, switch resource manager 130 may perform method 200 of FIG. 2.

Figure 2:
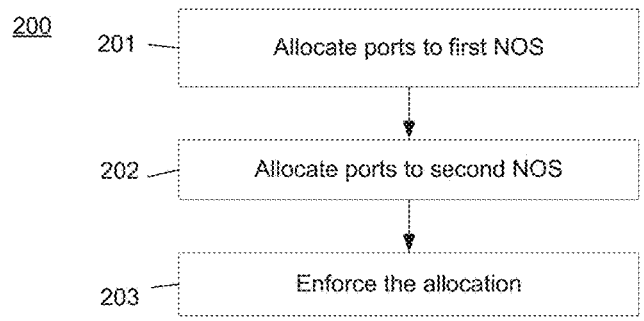
FIG. 2 illustrates a flow chart of an example method for a switch resource manager, according to an example.

FIG. 2 illustrates a flow chart of an example method 200 for a switch resource manager (e.g., switch resource manager 130) to partition resources in a network switching device (e.g., network switching device 100), according to an example. The description of method 200 is non-limiting, and steps may be added to and omitted from method 200 without departing from the scope of the disclosure. Method 200 will now be described with reference to switch resource manager 130.

Method 200 may begin at 201, where the switch resource manager 130 may allocate a first group of ports (e.g., ports 1-64) of ports 150 to the first NOS 110. At 202, switch resource manager 130 may allocate a second group of ports (e.g., ports 65-128) of ports 150 to the second NOS 120. At 203, switch resource manager 130 may enforce the allocation so that the first NOS 110 can control packet switching device 140 only for the first group of ports and so that the second NOS 120 can control packet switching device 140 only for the second group of ports. As a result of the enforcement, first NOS 110 and second NOS 120 may operate within network switching device 100 without impacting each other, and may cause network switching device 100 to operate in a deterministic way since the resources will not receive conflicting instructions from the different NOSs 110, 120.

To ensure proper operation within a wider network in which network switching device 100 is deployed, the first NOS 110 and second NOS 120 (and their corresponding assigned resources) are treated as separate and independent network entities. For example, each will have its own set of MAC addresses (e.g., based on the port group it is assigned) and its own IP addresses. This way each NOS will be viewed as a separate network device by the rest of the network devices in the network. Switch resource manager 130 can track the assignment of MAC and IP tables, as well as the assignment of port groups and any other resource of device 100, in a table (e.g., resource map 422 in FIG. 4(*a*)).

Note that the equal port allocation described in this example is not required. One NOS may be allocated a greater number of ports than the other NOS. Additionally, it may be that it is not intended for both NOSs to actively switch traffic.

Figure 3:
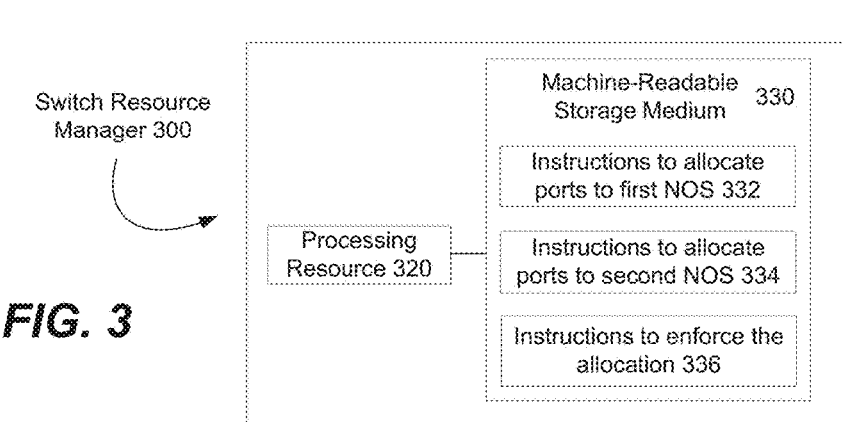
FIG. 3 illustrates example instructions for a switch resource manager stored on a computer readable medium, according to an example.

FIG. 3 illustrates example instructions 332, 334, 336 for a switch resource manager 300 stored on a computer readable medium 330, according to an example. The instructions may be executed by a processing resource 320 to cause switch resource manager 300 to perform the functions underlying the instructions. The computer readable medium 330 and processing resource 320 may be components within a control plane of a network device (e.g., network switching device 100), such that the switch resource manager is implemented in the control plane of a network switching device. Instructions 332-336 mirror blocks 201-203 of FIG. 2, so a description of them will not be repeated.

Figure 4A:
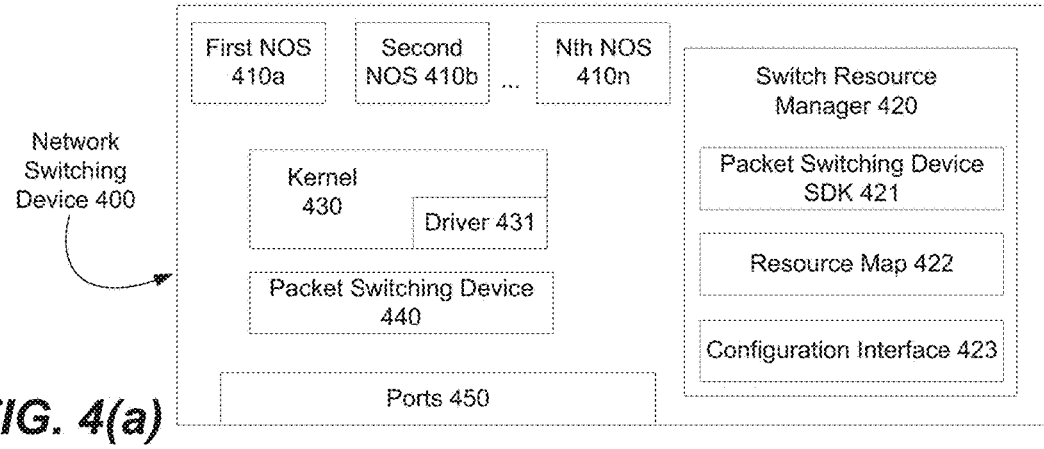
FIG. 4(a) illustrates a network switching device including a switch resource manager, according to an example.

FIG. 4(*a*) illustrates a network switching device 400 including a switch resource manager 420, according to an example. Many of the components of network switching device 400 are similar to the components of network switching device 100, as is evident by the names of the components. Additionally, other elements not depicted in FIG. 4(*a*) may be included in device 400. Accordingly, FIG. 4(*a*) should be interpreted in light of the description of FIGS. 1-3. The following description will focus on the added/changed elements.

Network switching device 400 includes ports 450 and packet switching device 440, which are similar to ports 150 and packet switching device 140. Device 400 also includes a kernel 430. Kernel 430 is an operating system kernel, such as a version of the Linux kernel. Kernel 430 includes the basic functioning of an operating system. One of the responsibilities of kernel 430 is to manage access to the hardware resources of device 400 by software processes running in device 400. For example, kernel 430 controls access to the processing resources, memory, and physical connections (e.g., PCIe bus) in the control plane. Kernel 430 also controls access to the packet switching device 440. To that effect, kernel 430 includes a driver 431 for packet switching device 440. The driver is a software module that enables kernel 430 to interface with a software process trying to send commands to the packet switching device 440 as well to interface with the packet switching device 440 itself.

Device 400 includes one or more NOSs (410*a*, 410*b*, 410*n*). The NOS(s) includes a protocol stack, and different NOSs may include different protocol stacks. The NOSs do not themselves comprise an operating system kernel. Instead, the NOSs interface with a single kernel—kernel 430. Kernel mediates access to the control plane resources, such as the CPU and memory, among the NOSs. In an example, the NOSs are implemented using container technology, such as Linux Containers. Accordingly, the NOSs can be executed in user space of the device 400.

While the kernel 430 may deploy the NOSs and manage resource usage of control plane resources (e.g., CPU, memory, disk/flash), interaction between the NOSs and the data plane (e.g., packet switching device 440) is mediated by switch resource manager 420. To facilitate this, switch resource manager 420 can include a packet switching device software development kit (SDK) 421, a resource map 422, and a configuration interface 423.

SDK 421 is a software development kit for the packet switching device 440. SDK 421 includes a library of commands that are available for configuring packet switching device 440. SDK 421 also includes an application programming interface for the NOSs 410*a*, 410*b*, 410*n*, so that the NOSs can make SDK calls in which an NOS requests to invoke one or more commands for configuring packet switching device 440. SDK 421 also includes a system interface for interfacing with kernel 430, so that SDK calls from an NOS can be transmitted to the kernel 430 and ultimately to packet switching device 440. An example workflow is illustrated in FIG. 4(*b*), as will be described shortly.

Resource map 422 is a table or other data structure stored in memory of device 400. Resource map 422 is used by switch resource manager 420 to track which resources of device 400, and particularly of packet switching device 440, have been allocated to the NOSs executing on the device 400. Each NOS may have a unique identifier within resource map 422.

In addition to tracking port allocation and management IP address allocation, various other resources may be tracked as well. For example, resources of packet switching device 440 (e.g., tables, counters, ACLs) may be allocated to specific NOSs. For instance, table resources may be tracked with pointers to the beginning and end of the table area (for each table) allocated to a particular NOS. ACL resources may be tracked by indicating a maximum number of ACL entries allowed per NOS. Counter resources may be tracked by the maximum number of counters allowed for a particular NOS. Other resources include the maximum number of virtual routers, maximum number of interfaces, and the like. The resources may be allocated according to various methods. For example, resources can be allocated based on user or network controller configuration settings, based on requests from the NOSs themselves, in proportion to the number of ports dedicated to a particular NOS, or according to other methods.

Configuration interface 423 is an interface to enable a user (e.g., network administrator) or a network controller (e.g., Software Defined Network controller) to allocate resources to one or more NOSs by populating the resource map with the desired allocation. For a user, the interface can be any suitable interface, such as a command line interface or a graphical user interface. For a network controller, the interface can be an application programming interface or a controller-to-managed-device interface.

Figure 4B:
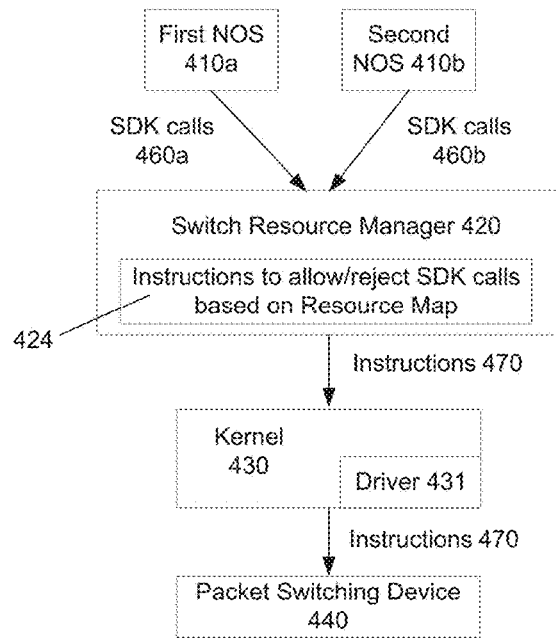
FIG. 4(b) depicts an example work flow diagram illustrating the intermediary role of a switch resource manager between a network operating system and an operating system kernel, according to an example.

FIG. 4(b) depicts an example work flow diagram illustrating the intermediary role of switch resource manager 420 between NOS 410a, 410b and kernel 430, according to an example. NOS 410a may send one or more SDK calls 460a and NOS 410b may send one or more SDK calls 460b to switch resource manager 420. SDK calls 460a, 460b are communicated via the application programming interface to SDK 421 of switch resource manager 420. Switch resource manager 420 has instructions 424 to verify that the SDK calls are proper. For example, switch resource manager 420 may examine the parameters of each SDK call to be sure that the calling NOS is not trying to access resources that it has not been allocated. Switch resource manager 420 may consult resource map 422 to make this determination. Additionally, switch resource manager 420 may check to make sure that the SDK call is not going to impact other NOSs, such as an SDK call to cause packet switching device 440 to execute a power cycle, which would take it offline. In such a case, before allowing such a call, the switch resource manager 420 can verify that the command is necessary and may alert the other NOSs of the impending event via a multicast message.

If determined that the SDK call is not allowed, switch resource manager 420 may reject the SDK call and notify the calling NOS. If determined that the SDK call is allowed, switch resource manager 420 may accept the call and send appropriate instructions 470 via driver 431 to packet switching device 440, instructing packet switching device 440 to implement the intended command from the allowed SDK call. Responses and other messages from packet switching device 440 may similarly be sent to the appropriate NOS by following a similar procedure in reverse.

In addition to tracking resources, switch resource manager 430 may configure the resources or structures of packet switching device 440 that are independent from the number of NOSs (in other words, those things that wouldn't be allocated to a particular NOS or controlled by a single NOS). For example, the switch resource manager 430 may be responsible for configuring the status (e.g., Up, Down, Unknown), switching mode (e.g., Cut_Through, Store/Forward), and table partitioning (the size of the individual tables as opposed to the allocation of the tables to NOSs) of the packet switching device 440.

Switch resource manager 430 may also multicast events relating to general operation of the packet switching device 440 to all NOSs 410a, 410b, 410n. For example, a change in status or switching mode of the packet switching device 440 is an event that all NOSs should be aware of. Similarly, if switch resource manager 430 is aware of an event like a scheduled power cycle of packet switching device 440, such an event could be multicasted to the NOSs.

FIG. 5 illustrates a network switching device 500 including a switch resource manager 520, according to an example. Many of the components of network switching device 500 are similar to the components of network switching device 100, 400, as is evident by the names of the components. Additionally, other elements not depicted in FIG. 5 may be included in device 500. Accordingly, FIG. 5 should be interpreted in light of the description of FIGS. 1-4(b). The following description will focus on the added/changed elements.

Network switching device 500 includes a packet switching device 540, which can be similar to packet switching device 140, 440. Device 500 also includes an operating system kernel 530, which may be similar to kernel 430. Kernel 530 includes a driver 531 for packet switching device 540. Driver 531 may be similar to driver 431. Device 500 may also include a switch resource manager 520, which may be similar to switch resource manager 130, 420. Switch resource manager 520 may include a library 521, which is a library of commands for packet switching device 540. The library 521 may be part of a software development kit (SDK) for packet switching device 540, such as SDK 421. Switch resource manager 520 may send commands to packet switching device 540 via driver 531.

Kernel 530 may load an NOS 510 onto device 500. For example, kernel 530 may load an NOS 510 into user space of device 500. Kernel 530 may use container technology such as Linux Containers to load NOS 510 into user space of device 500. NOS 510 may be similar to NOS 110, 120, 410a, 410b, 410n. For example, NOS 510 may include a protocol stack and may lack its own kernel. Switch resource manager 520 may receive from NOS 510 requests to send commands from library 521 to packet switching device 540. Switch resource manager 520 may process the commands (e.g., verify that the command is valid and within allocated resources to NOS 510) and pass the commands to packet switching device 540 via driver 531 if the commands are permissible.

FIG. 6 illustrates a network switching device including a switch resource manager, according to an example. Many of the components of network switching device 600 are similar to the components of network switching device 100, 400, 500, as is evident by the names of the components. Additionally, other elements not depicted in FIG. 6 may be included in device 600. Accordingly, FIG. 6 should be interpreted in light of the description of FIGS. 1-5. The following description will focus on the added/changed elements.

Network switching device 600 may include packet switching devices 640a, 640b, which can be similar to packet switching device 140, 440, 540. Packet switching devices 640a, 640b may be interconnected within device 600 via a switch fabric device. Packet switching devices 640a, 640b may also be interconnected via an external cable connecting assigned ports of 640a to assigned ports of 640b.

Device 600 may include a kernel 630, which may be similar to kernel 430, 530. Kernel 630 includes a driver 631 for packet switching devices 640a, 640b. Driver 631 may be similar to driver 431, 531. If packet switching devices 640a, 640b are different, such as by supporting different libraries of commands, two drivers (one for each packet switching device) may be installed in kernel 630. Kernel 630 may also include a container engine 632. Container engine 632 may be used by kernel 630 to deploy containers within user space of device 600, such as to host an application. For example, container engine 632 may implement Linux Containers.

Kernel 630 may load one or more network operating systems (NOS) into user space of device 600. For example, kernel 630 may use container engine 632 to load a first NOS 610a and a second NOS 610b into user space. NOSs 610a, 610b may be similar to NOS 110, 120, 410a-n, 510, and may contain a protocol stack. For example, NOS 610a may include a first protocol stack 611 and NOS 610b may include a second protocol stack 612. The first and second protocol stacks 611, 612 may be the same or different (e.g., supporting different protocols, designed by different vendors, etc.) from each other.

Device 600 may include a switch resource manager 620a with a library 621. Switch resource manager 620a may be similar to switch resource manager 130, 420, 520, and library 621 may be similar to library 521. If packet switching devices 640a, 640b are different, a first library 621 may support packet switching device 640a while a second library 622 may support packet switching device 640b. In such a case, a second switch resource manager 620b may be included in device 600 to mediate between the NOSs 610a, 610b and the packet switching device 640b.

Ports of device 600 and resources of packet switching device 640a, 640b may be allocated to NOSs 610a, 610b. For example, in an example, ports associated with packet switching device 640a and resources of packet switching device 640a may be allocated to NOS 610a while ports associated with packet switching device 640b and resources of packet switching device 640b may be allocated to NOS 610b. NOS 610a would thus send commands to packet switching device 640a via switch resource manager 620a and NOS 610b would send commands to packet switching device 640b via switch resource manager 620b. In other examples, ports and resources of the two packet switching devices could be allocated to both NOSs, which would thus entail interaction with both switch resource managers.

The network switching devices disclosed herein (e.g., 100, 400, 500, 600) may include one or more processing resources and one or more machine-readable storage media. A processing resource may include one or more central processing unit (CPU), one or more semiconductor-based microprocessor, one or more digital signal processor (DSP) such as a digital image processing unit, other hardware devices or processing elements suitable to retrieve and execute instructions stored in memory, or combinations thereof. The processing resource can include single or multiple cores on a chip, multiple cores across multiple chips, multiple cores across multiple devices, or combinations thereof. The processing resource may fetch, decode, and execute instructions from memory to perform various functions. As an alternative or in addition to retrieving and executing instructions, the processing resource may include one or more integrated circuit (IC), including an application specific integrated circuit (ASIC), a content addressable memory (CAM) or ternary content addressable memory (TCAM), other control logic, other electronic circuits, or combinations thereof that include a number of electronic components for performing various tasks or functions.

The processing resource may include memory, such as a machine-readable storage medium. The machine-readable storage medium may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium can be computer-readable and non-transitory. Additionally, network switching device 300 may include one or more machine-readable storage media separate from the one or more processing resources, as well as additional hardware elements, such as TCAMs and ASICs.

In the present disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a number of" something can refer to one or more such things. For example, "a number of widgets" can refer to one or more widgets. Also, as used herein, "a plurality of" something can refer to more than one of such things.

The above specification, examples and data provide a description of the method and applications, and use of the system and method of the present disclosure. Since many examples can be made without departing from the spirit and scope of the systems and methods of the present disclosure, this specification merely sets forth some of the many possible embodiments, configurations, and implementations. Furthermore, numerous details are set forth to provide an understanding of the system, method, and techniques of the disclosure. However, it will be understood by those skilled in the art that the system, method, and techniques may be practiced without these details. While the system, method, and techniques have been disclosed with respect to a limited number of embodiments, those skilled in the art will appreciate numerous modifications and variations therefrom. It is intended that the appended claims cover such modifications and variations.

What is claimed is:

1. A network switching device, comprising:
   ports;
   a packet switching device associated with the ports;
   a central processing unit (CPU) and memory;
   an operating system kernel to mediate access to the CPU, memory, and packet switching device, the operating system kernel including a driver for the packet switching device;
   a first network operating system (NOS) instance;
   a second NOS instance;
   a switch resource manager to:
   (1) allocate a first plurality of the ports to the first NOS instance and a second plurality of the ports to the second NOS instance,
   (2) enforce the allocation such that the first NOS instance can control the packet switching device for only the first plurality of the ports and the second NOS instance can control the packet switching device for only the second plurality of the ports, the switch resource manager including a software development kit (SDK) for the packet switching device in order to interface with the driver for the packet switching device,
   (3) maintain a resource map to track the allocation of the ports to the first and second NOS instances,
   (4) enforce the allocation by verifying that calls from the first and second NOS instances to the SDK for the packet switching device do not violate the allocation contained in the resource map, and
   (5) deny a call from the first or second NOS instance if the call violates the allocation.

2. The device of claim 1, further comprising an interface for the switch resource manager to receive instructions for allocating the ports to the first and second NOS instances.

3. The device of claim 1, wherein the switch resource manager is to allocate other resources of the network switching device and the packet switching device to the first and second NOS instances and track the allocations of the other resources in the resource map.

4. The device of claim 1, wherein the switch resource manager is to multicast events relating to general operation of the packet switching device to the first and second NOS instances.

5. The device of claim 1, wherein the first NOS instance and second NOS instance act as separate and independent network devices with different addresses within a network in which the network switching device is deployed.

6. The device of claim 1, wherein the first and second NOS instances are executed in user space of the network switching device rather than in kernel space of the network switching device.

7. The device of claim 1, wherein the first NOS instance comprises a network protocol stack that is different from a network protocol stack of the second NOS instance.

8. The device of claim 1, wherein the first NOS instance and the second NOS instance do not comprise an operating system kernel.

9. A network switching device, comprising:
ports;
a packet switching device associated with the ports;
a central processing unit (CPU) and memory;
an operating system kernel to mediate access to the CPU, memory, and packet switching device, the operating system kernel including a driver for the packet switching device;
a switch resource manager including a library of commands for the packet switching device, the switch resource manager to:
(1) send commands to the packet switching device via the driver;
(2) allocate a first plurality of the ports to a first network operating system (NOS) instance and a second plurality of the ports to a second NOS instance,
(3) enforce the allocation such that the first NOS instance can control the packet switching device for only the first plurality of the ports and the second NOS instance can control the packet switching device for only the second plurality of the ports, the switch resource manager including a software development kit (SDK) for the packet switching device in order to interface with the driver for the packet switching device,
(4) maintain a resource map to track the allocation of the ports to the first and second NOS instances,
(5) enforce the allocation by verifying that calls from the first and second NOS instances to the SDK for the packet switching device do not violate the allocation contained in the resource map, and
(6) deny a call from the first or second NOS instance if the call violates the allocation; and
the operating system kernel to load a network operating system instance into user space of the network switching device.

10. The device of claim 9, the operating system kernel to load (1) the first NOS instance, the first NOS instance comprising a first protocol stack into the user space; and (2) the second NOS instance, the second NOS instance comprising a second protocol stack into the user space, wherein the first and second network operating system instances do not include a kernel.

11. The device of claim 10, wherein the first and second NOS instances are executed in the user space using Linux containers.

12. The device of claim 10, further comprising a second packet switching device of a different type than the packet switching device, a second driver for the second packet switching device, and a second switch resource manager including a second library of commands for the second packet switching device, wherein:
the first NOS instance is allocated the ports associated with the packet switching device, and is to interface with the packet switching device via the switch resource manager; and
the second NOS instance is allocated ports associated with the second packet switching device, and is to interface with the second packet switching device via the second switch resource manager.

13. A switch resource manager for a network switching device, comprising:
a software development kit (SDK) to interface with a driver for a packet switching device of the network switching device;
a resource map to identify an allocation of ports associated with the packet switching device to a first network operating system instance (NOS) and a second NOS installed in user space of the network switching device, wherein the switch resource manager is to:
enforce the allocation by verifying that calls from the first and second NOS instances to the SDK for the packet switching device do not violate the allocation contained in the resource map, and
deny a call from the first or second NOS instance if the call violates the allocation; and
a configuration interface to receive instructions to populate the resource map, wherein the switch resource manager is separate from the first NOS instance, from the second NOS instance, and from an operating system kernel of the network switching device.

14. A non-transitory computer-readable storage medium comprising instructions thereon that, when executed by a processor, perform the following set of actions:
allocating, via a switch resource manager, a first plurality of ports of a network switching device to a first network operating system (NOS) instance and a second plurality of the ports of the network switching device to a second NOS instance;
enforcing, via the switch resource manager, the allocation such that the first NOS instance can control a packet switching device included in the network switching device for only the first plurality of the ports and the second NOS instance can control the packet switching device for only the second plurality of the ports, the switch resource manager including a software development kit (SDK) for a packet switching device in order to interface with a driver for the packet switching device, wherein the driver is included in an operating system kernel;
maintaining, via the switch resource manager, a resource map to track the allocation of the ports to the first and second NOS instances;
enforcing, via the switch resource manager, the allocation by verifying that calls from the first and second NOS instances to the SDK for the packet switching device do not violate the allocation contained in the resource map; and
denying, via the switch resource manager, a call from the first or second NOS instance if the call violates the allocation.

15. The non-transitory computer-readable storage medium of claim 14, wherein the set of actions further comprises:
   allocating other resources of the network switching device and the packet switching device to the first and second NOS instances; and
   tracking the allocations of the other resources in the resource map.

16. The non-transitory computer-readable storage medium of claim 14, wherein the set of actions further comprises:
   multicasting events relating to general operation of the packet switching device to the first and second NOS instances.

17. The non-transitory computer-readable storage medium of claim 14, wherein the first NOS instance and second NOS instance act as separate and independent network devices with different addresses within a network in which the network switching device is deployed.

18. The non-transitory computer-readable storage medium of claim 14, wherein the first and second NOS instances are executed in user space of the network switching device rather than in kernel space of the network switching device.

19. The non-transitory computer-readable storage medium of claim 14, wherein the first NOS instance comprises a network protocol stack that is different from a network protocol stack of the second NOS instance.

20. The non-transitory computer-readable storage medium of claim 14, wherein the first NOS instance and the second NOS instance do not comprise an operating system kernel.

\* \* \* \* \*